(12) United States Patent
Langenbacher

(10) Patent No.: US 10,018,286 B2
(45) Date of Patent: Jul. 10, 2018

(54) GUIDING OR HOLDING DEVICE FOR RECEIVING PIPES, CABLES OR FLEXIBLE TUBES

(71) Applicant: FKB GmbH, Oberndorf (DE)

(72) Inventor: Oliver Langenbacher, Oberndorf am Neckar (DE)

(73) Assignee: FKB GmbH, Oberndorf (DE)

(*) Notice: Subject to any disclaimer, the term of this patent is extended or adjusted under 35 U.S.C. 154(b) by 0 days.

(21) Appl. No.: 15/340,463

(22) Filed: Nov. 1, 2016

(65) Prior Publication Data

US 2017/0122462 A1    May 4, 2017

(30) Foreign Application Priority Data

Nov. 4, 2015    (DE) .................... 20 2015 007 620 U

(51) Int. Cl.
*F16L 3/22*    (2006.01)
*F16L 3/10*    (2006.01)

(52) U.S. Cl.
CPC ................ *F16L 3/221* (2013.01); *F16L 3/10* (2013.01)

(58) Field of Classification Search
CPC .................................. F16L 3/12; F16L 3/1236
See application file for complete search history.

(56) References Cited

U.S. PATENT DOCUMENTS

| 3,954,238 A | 5/1976 | Nivet |
| 4,264,047 A * | 4/1981 | Nelson .................. F16L 3/12 24/339 |
| 5,209,441 A * | 5/1993 | Satoh .................. F16L 3/223 174/135 |
| 5,820,048 A * | 10/1998 | Shereyk ............... F16L 3/1215 24/487 |

FOREIGN PATENT DOCUMENTS

| DE | 24 46 133 A1 | 4/1975 |
| DE | 88 02 421 U1 | 5/1988 |
| DE | 44 35 177 C2 | 6/1996 |
| DE | 198 56 945 C1 | 6/2000 |
| DE | 20 2008 017 555 U1 | 12/2009 |
| EP | 0 486 442 A1 | 5/1992 |
| GB | 1 191 102 A | 5/1970 |
| JP | S56-3376 A | 1/1981 |

* cited by examiner

*Primary Examiner* — Amy J. Sterling
(74) *Attorney, Agent, or Firm* — McGlew and Tuttle, P.C.

(57) ABSTRACT

A guiding or holding device has a U-shaped or C-shaped receiving element (1, 1/1, 1/2) for receiving a pipe, flexible tube or a cable. The receiving element (1, 1/1, 1/2) has a coupling section (3, 3/1, 3/2) for detachable coupling with other components. The coupling section (3, 3/1, 3/2) is arranged in a circumferential area of the receiving element (1, 1/1, 1/2) and has an outer mounting surface (4, 4/1, 4/2), in the area of which coupling elements (20, 21, 20/1, 21/1, 20/2, 21/2, 24, 24/1, 24/2) projecting over the mounting surface (4, 4/1, 4/2) as well as protruding into the mounting surface are arranged. With the coupling elements (20, 21, 20/1, 21/1, 20/2, 21/2, 24, 24/1, 24/2), the receiving element (1, 1/1, 1/2) can be coupled as desired with another receiving element (1, 1/1 or 1/2), with a holding element (60) or with a connection element (40, 50).

11 Claims, 7 Drawing Sheets

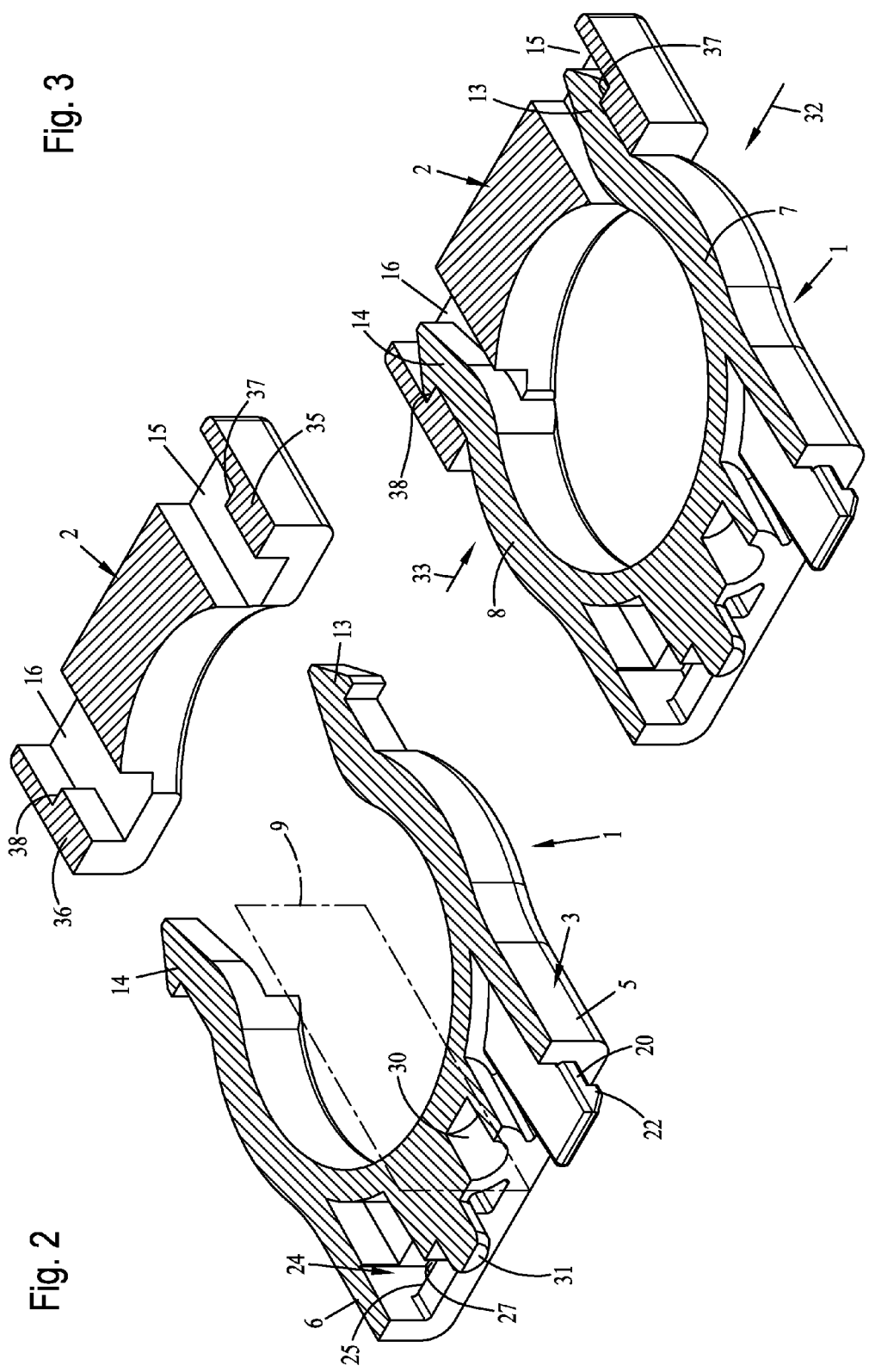

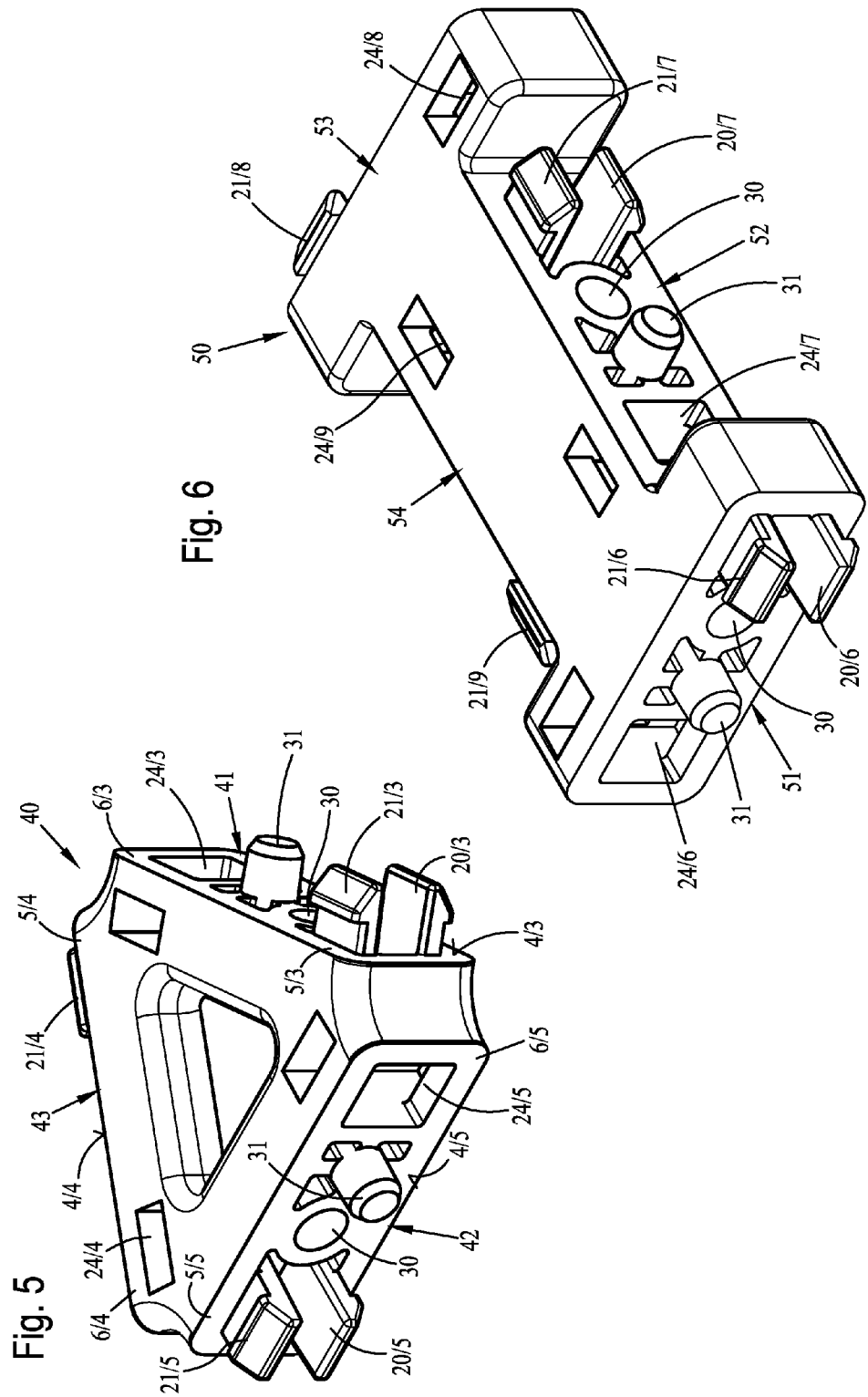

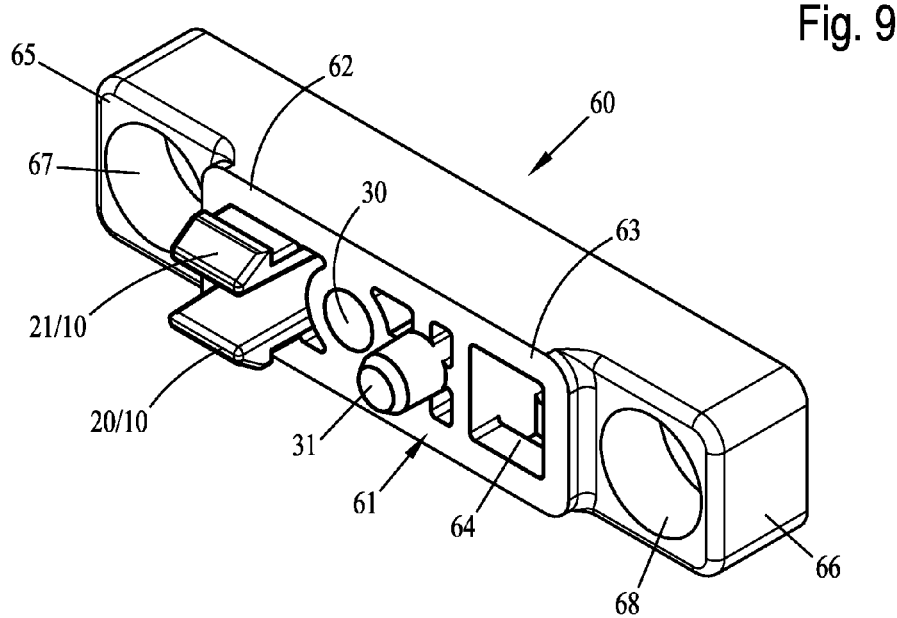
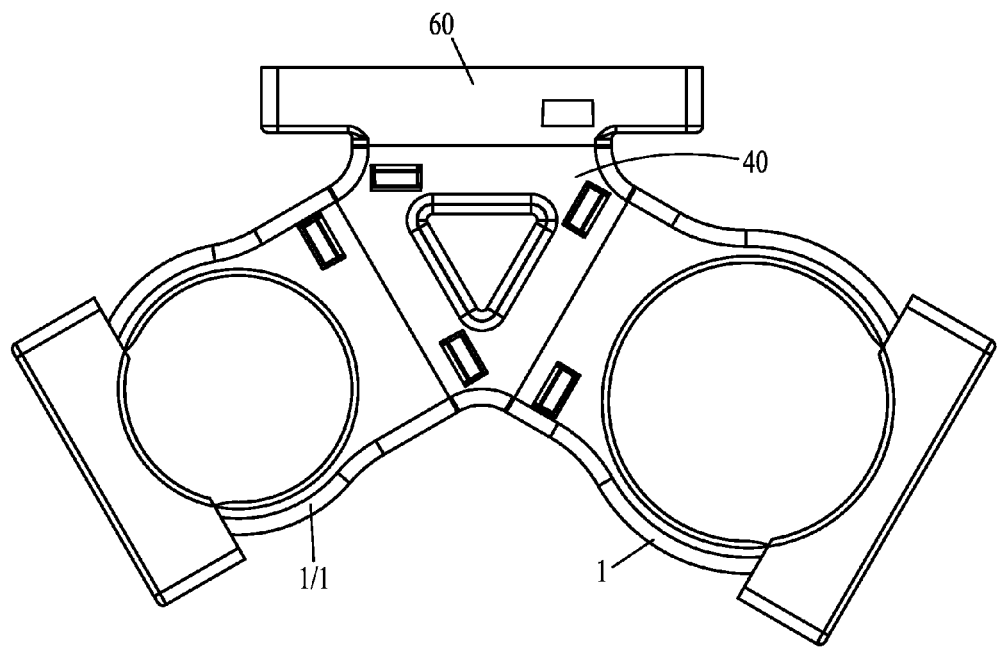

GUIDING OR HOLDING DEVICE FOR RECEIVING PIPES, CABLES OR FLEXIBLE TUBES

CROSS REFERENCE TO RELATED APPLICATIONS

This application claims the benefit of priority under 35 U.S.C. § 119 of German Application 20 2015 007 620.3 filed Nov. 4, 2015 the entire contents of which are incorporated herein by reference.

FIELD OF THE INVENTION

The present invention relates to a guiding or holding device with a U-shaped or C-shaped receiving element for receiving a pipe, flexible tube or a cable, wherein the receiving element has a coupling section for detachable coupling with other components.

BACKGROUND OF THE INVENTION

Devices of this type for guiding and/or holding objects in the form of a pipe, flexible tube or a cable or similar objects have already been known for a long time.

Thus, a device called a fastening clamp for fastening various types of pipelines, pipe fittings, covers or cables on a wall is known from DE 24 46 133 A1. This clamp has a type of foot part, from which two side parts arranged laterally at the foot part extend at approximately right angles in relation to the foot part. These side parts form, together with the foot part, a type of receiving element, which has, for example, a C-shaped or U-shaped inner contour extending in the shape of a circular arc, into which, for example, a pipe or a flexible tube can be inserted. The side parts form mutually spaced end sections, on which a closing or lid part can be placed to secure the received component. The inner contour of the lid part is adapted to the inner contour of the receiving element and can supplement this, for example, to form a circular opening. Instead of such a circular inner contour, other cross-sectional shapes of the opening, for example, a polygon or the like, may also be provided, which ultimately depends on the cross-sectional shape of the object to be received.

The foot part has a flat base to arrange this guiding or holding device on a foundation. Furthermore, a guiding or holding device, which can be used for a plurality of pipelines to be arranged at spaced locations next to each other, is also known from DE 24 46 133 A1. The foot part has a relatively "broad" configuration for this, so that a plurality of side walls, which form in pairs corresponding receiving elements for receiving a corresponding pipeline, can be accommodated next to each other. To secure the received components, a closing or lid element is provided, which "spans" over all "side walls" together in the closed state. Since the "side walls" associated with one another in pairs have the same predetermined distance from one another, only pipelines having the same diameter can be received. If pipelines of different diameters are to be received, a device dimensioned specially for this pipeline must always be provided. Variable use is thus not possible.

Furthermore, a guiding or holding device for pipes or similar, elongated objects, which comprises an essentially U-shaped basic body, which forms the receiving element for the pipe to be received, is known from DE 44 35 177 C2. This basic body has a bottom section with a flat base surface, which is joined laterally by side walls extending approximately at right angles thereto, which form flat limiting surfaces extending at right angles to the side walls at their free ends. The bottom part forms, together with the side walls, a receiving element with a U-shaped or C-shaped inner contour, which receives the pipe and which preferably extends in a circular arc shape in the object of DE 44 35 177 C2. In the base of the bottom part and the outer, likewise flat limiting surfaces of the free ends, undercut grooves, which extend parallel to these surfaces, are provided, said grooves being used to receive connection elements that can be inserted into the grooves.

Two or more adjacent receiving elements can thus be connected to one another in the object of DE 44 35 177 C2 by means of these connection pieces, so that receiving elements of different diameters can also be combined with one another into a guiding or holding device for receiving different pipe cross sections. At least two of these additional connection pieces are necessary to connect two receiving elements. In this basic configuration of these receiving elements, a total of eight such undercut grooves are provided in the base surface and in the lateral surfaces, which leads to a complicated and complex configuration.

Furthermore, a guiding or holding device for pipelines, flexible tubes, cables and the like, which has a foot part with two side parts, which together form an opening for receiving the corresponding pipeline, is known from DE 198 56 945 C1. The two side parts form a type of receiving element together with the foot part in this device as well. This receiving element defines with its two side parts a plane of symmetry extending at right angles to the receiving element, the foot part being arranged such that it extends symmetrically to this plane of symmetry approximately at right angles to the two side parts.

Furthermore, a lid, which is arranged pivotably and in one piece with one of the side parts, is provided in the object of DE 198 56 945 C1. At its free end, the lid has a type of holding claw, with which the cover can be caused to detachably mesh in the closed state with locking teeth arranged on the outer side on the other side part in the free end area thereof. To make it possible to connect two such guiding or holding devices to one another "one over the other," the foot part is provided on the bottom side with a laterally open holding groove having a T-shaped configuration, with which the one receiving element can be connected to the closed lid of another receiving element having an identical configuration by the first receiving element with its holding groove being pushed over the closed lid of the second receiving element. Two or more receiving elements can thus be combined with one another to form a guiding or holding device. Since this holding groove is open on both sides and the lid does not form a stop of any kind, this positive-locking connection may inadvertently separate. Furthermore, it is difficult to replace a component received in the "lower" receiving element, for example, for repair purposes, because the lid can be opening only conditionally with the second receiving element attached.

Further, one of the side parts has, in the object of DE 198 56 945 C1, an outwardly projecting, T-shaped fastening element in its "lower" end area located towards the holding groove, while the other side part is likewise provided with a recess having a T-shaped configuration in the lower end area of the side part towards the holding groove. Due to this configuration, two receiving elements can also be brought stationarily into connection with one another next to each other. The recess extends here, starting from the holding groove of the bottom part, parallel to the direction in which the side part extends and its longitudinal extension is limited. To connect receiving elements laterally, the one receiving element with the recess of its side part is attached from the "top" to the fastening element of the side part of the other receiving element. This type of connection may also separate inadvertently, especially in case of mounting the first receiving element on a ceiling, because the fastening element of the second receiving element is to be inserted into the recess from "below." Thus, a plurality of receiving elements can be connected to one another in the object of DE 198 56 945 C1 to form a guiding or holding device. However, there always is a risk that the connection may separate again by itself.

For a self-supporting mounting on ceilings, walls or on the floor, various holding elements are also provided in the subject of DE 198 56 945 C1, which are first screwed in a self-supporting manner to the ceiling, the wall or the floor. Such a holding element may be configured as a double-T section or as a holding plate and have laterally projecting holding webs, so that a receiving element with its bottom-side holding groove can be pushed over these holding webs. The drawback that the connection between the holding groove and the holding element may inadvertently separate is present here as well, especially in case of mounting on a wall with the holding groove extending in the vertical direction.

SUMMARY OF THE INVENTION

Accordingly, a basic object of the present invention is to provide a guiding or holding device, whose components can be connected to one another as desired, without an accidental separation of the connections being able to occur.

The object is accomplished according to the present invention with a guiding or holding device with a U-shaped or C-shaped receiving element for receiving a pipe, a flexible tube or a cable. The receiving element has a coupling section for detachable coupling with other components. The coupling section is arranged in a circumferential area of the receiving element and having an outer mounting surface, in the area of which coupling elements are arranged, which project over the mounting surface as well as protrude into the mounting surface, and via which the receiving element may optionally be coupled with another receiving element, with a holding element or with a connection element.

A guiding or holding device, which can be used in an extremely variable manner, is provided by the configuration according to the present invention, because the receiving element can variably be coupled either with another receiving element, with a holding element or also with a connection element, which then form in their mounted state the guiding or holding device proper, which can be used as desired to receive only one tubular object or also two or more such objects. In particular, receiving elements of different diameters can be coupled with one another, so that pipes or flexible tubes or cables or the like having different diameters can be received and thus held or guided together. It is thus possible, for example, by correspondingly selecting receiving elements, holding elements and/or connection elements, to hold or to guide flexible tubes, on the one hand, and also corresponding electric cables, on the other hand, in a "line.". Such configurations may be necessary, for example, if the feed flexible tube shall be routed in a washing machine parallel to the electrical cable of an electric strop valve from the site at which water is tapped to the washing machine. The possibility of coupling with an additional holding element also makes it possible to fasten such a line, for example, on the wall of a building or even directly to the washing machine on the housing thereof.

Due to the coupling elements projecting over the mounting surface of the coupling section, in cooperation with the coupling elements protruding into the mounting surface, two receiving elements can be put together in a simple manner and cannot be laterally adjusted in relation to one another any longer in this mounted state. The second receiving element has in this respect the same coupling elements that are likewise arranged on a corresponding mounting surface. The optionally provided holding elements or connection elements are also provided with such a mounting surface (with more such mounting surfaces) with corresponding coupling elements, so that one or more receiving elements can variably be fitted together with these to form a guiding or holding device.

If the receiving element is coupled "only" with one holding element, this corresponding guiding or holding device is used, for example, for mounting a pipe or flexible tube or the like on a wall. For example, two receiving elements and a holding element can be coupled with one another via the connection element provided, so that, for example, two pipes or flexible tubes can be stationarily mounted on a wall or a ceiling. "Loose" installation of two or more pipes, flexible tubes or cables may also be desired, so that the connection element can be coupled with a plurality of receiving elements. Two or more connection elements may also be coupled with one another, and they are then, in turn, in connection with receiving elements and/or with a holding element.

Provisions may thus be made according to another aspect of the invention for the mounting surface to define a plane of symmetry, which extends at right angles to the receiving element and for the coupling elements to be configured as a locking element projecting over the mounting surface in a lateral area of the plane of symmetry and as a locking recess protruding into the mounting surface in the other lateral area of the plane of symmetry and for the locking element and the locking recess to be arranged mirror-symmetrically to the plane of symmetry. All coupling sections of the receiving element, of the holding element and of the connection element may have an identical configuration due to this configuration.

Especially the stability of the connection of the components via the coupling sections is improved by the configuration according to another aspect of the invention. The components can also be assembled in a simpler manner via their coupling sections. Accordingly, provisions may be made according to this aspect of the invention for a guide pin to be provided in the area of the mounting surface between the locking element and the locking recess and for a guide hole to be provided on the other side of the plane of symmetry, which guide pin and guide hole are arranged mirror-symmetrically to the plane of symmetry.

For a variable combination of the receiving elements and of the holding element, provisions are made according to another aspect of the invention for the additional receiving element or the holding device to be provided with a mounting surface, which has the same coupling elements as the receiving element to be connected to these.

This also applies according to another aspect of the invention to the connection element. Provisions may accordingly be made for the connection element to have two or more mounting surfaces for coupling with two or more receiving elements, which has the same coupling elements as the receiving elements to be connected to this. It is also possible as a result in conjunction with another aspect of the invention to connect a connection element to a holding element.

A component received in a receiving element is held securely due to the configuration according to another aspect of the invention. Provisions may accordingly be made for the receiving element to form mutually spaced holding legs, whose end sections form projecting detents, to which a securing strap with corresponding locking recesses can lockingly and detachably be attached.

Further, provisions may be made according to another aspect of the invention for the end sections of the receiving element to be arranged mirror-symmetrically to the plane of symmetry, As was mentioned above, the holding element may optionally be able to be coupled according to another aspect of the invention with a connection element or with a receiving element.

Based on the embodiment according to the present invention, a guiding or holding device is provided, which can have an extremely variable configuration based on the optional coupling possibilities of its components and can thus be adapted to the particular needs for guiding or holding individual tubular objects or a plurality of tubular objects. Depending on the given requirements, it is not absolutely necessary to use all the components. If, for example, no wall bracket is needed, the holding element may also be eliminated. If only the connection of two pipes or flexible tubes is needed for "loose" installation on a foundation, only two receiving elements are to be coupled with one another. However, needs dictating the provision of a plurality of receiving elements and of a plurality of connection elements are also conceivable. Two or more connection elements may also be necessary together with two or more holding elements, which can, in turn, be coupled with at least one receiving element.

The guiding or holding device with at least one receiving element is also not limited to receiving pipes or flexible tubes or cables. Other elongated objects can also be received in the receiving device for holding and/or guiding.

The present invention will be explained in more detail below as an example on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a perspective sectional view of the components from FIG. 1;

FIG. 3 is a perspective sectional view of the components from FIG. 2 in their mounted state;

FIG. 5 is a perspective view of a connection element, with which three receiving elements from the preceding drawing figures can be coupled;

FIG. 6 is a perspective view of a connection element, with which four receiving elements from the drawing figures can be coupled;

FIG. 9 is perspective view of an additional holding element, via which a receiving element can be mounted stationarily, for example, on a wall, a ceiling or a foundation; and FIG. 10 is a top view of the connection element from FIG. 5 with coupled holding element from FIG. 9 as well as with two coupled receiving elements.

DESCRIPTION OF THE PREFERRED EMBODIMENTS

Figure 1:
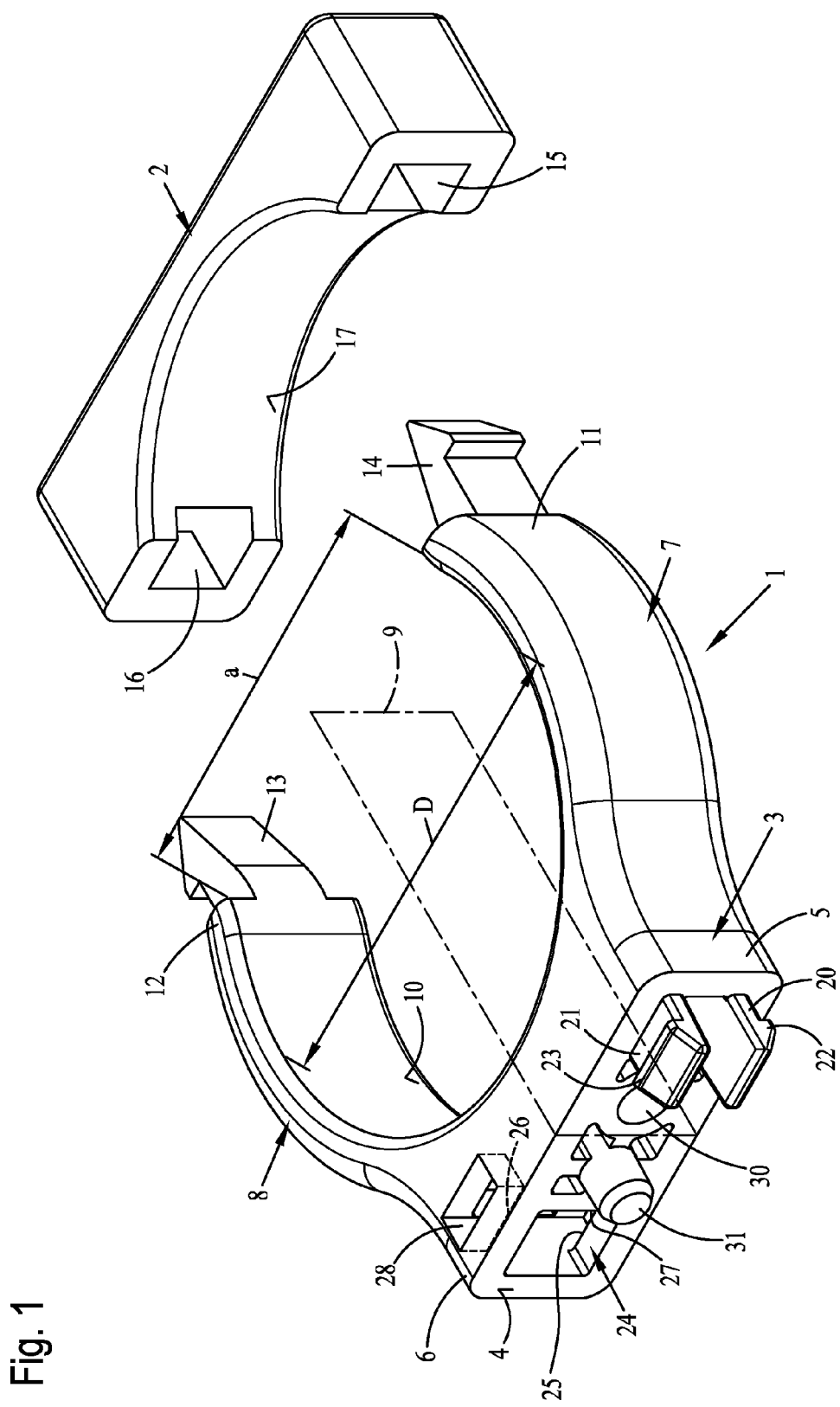
FIG. 1 is a perspective exploded view of a receiving element of a guiding or holding device and a corresponding securing strap.

Referring to the drawings, FIG. 1 shows a perspective view of a first embodiment variant of a receiving element 1 together with a securing strap 2. The receiving element forms a coupling section 3, which has a mounting surface 4 on the outside. A holding leg 7 and 8 each, which are arranged symmetrically to a plane of symmetry 9 extending at right angles to the coupling section 3 and to the mounting surface 4 thereof in the exemplary embodiment being shown, are provided in the lateral end areas 5, 6 of the coupling section 3. The two holding legs 7, 8 have the same length in the exemplary embodiment being shown and form, together with the coupling section 3, an inner, circular arc-shaped receiving surface 10. In the area of its free end sections 11, 12, the receiving surface 10 passes over into a respective inlet surface 13 and 14 extending radially outwardly in an arc-shaped pattern, so that a tubular object to be received between the holding legs 7, 8 can be inserted between the two holding legs 7, 8 in a simpler manner. The distance a between these inlet surfaces 13 and 14 is smaller in this case than the diameter D of the receiving surface 10, so that an object inserted fittingly between the holding legs 7, 8 cannot readily slip out.

The securing strap 2 is provided to reliably prevent, furthermore, such an accidental slipping out. To mount the securing strap 2 on the two holding legs 7, 8 stationarily and detachably, the holding legs 7, 8 form a respective locking hook 13 and 14 in extension of their end sections 11, 12. In the mounted state of the securing strap 2 on the two holding legs 7, 8, the locking hooks 13, 14 correspondingly mesh with locking recesses 15, 16 arranged laterally in the securing strap 2. The securing strap 2 has an inner surface 17, which extends in a circular arc-shaped pattern toward the receiving element 1 and which forms a cylindrical surface extending in the shape of a circular ring together with the inner receiving surface 10 of the holding legs 7, 8 and of the coupling section 3 in the state in which the securing strap 2 is mounted on the receiving element 1. It should be noted in this connection that the receiving surface 10 as well as the inner surface 17 do not necessarily have to form a circular cylindrical surface. These may also have another inner contour, which ultimately depends on the cross-sectional shape of the object to be received, which is preferably to be adapted to this inner contour.

Further, it can be seen from FIG. 1 that the flat mounting surface 4 is located opposite the two end sections 11 and 12 of the holding legs 7, 8 and has a plurality of coupling elements, via which the receiving element 1 can be assembled with an additional receiving element, with a connection element or also with a holding element, as will be explained later.

To make it possible to establish a corresponding plug-type connection to such an additional component, locking elements are provided in one lateral end area 5 of the coupling section 3 or the mounting surface 4 thereof in the form of two locking tongues 20, 21, which form outwardly directed detents 22, 23. In the second lateral end area 6, the mounting surface 4 of the additional component has a locking recess 24, which can lockingly be brought into connection with the locking elements 20 through 23 of a second receiving element or even of a correspondingly configured connection element or even of a holding element. The locking recess 24 has undercuts for this with detent edges 25 and 26, behind which the detents 23 and 24 of another receiving element can correspondingly extend lockingly in the mounted state. To make it possible to disengage the locking tongues 20, 21 with their detents 22, 23 from the detent edges 25, 26 of the locking recess 24, perforations 27 and 28, through which the detents 25, 26 can be pushed back by means of a tool, for example, a screwdriver, so that the locking connections are correspondingly detachable, are provided on the top side and on the underside in the coupling section 3 in the area of the locking recess 24.

Additional plug-type connections may be provided for the locking connection elements 20 through 24 shown. As can be seen in FIG. 1, a hole 30 is provided in the mounting surface 4 or the coupling section 3 between the plane of symmetry 9 and the locking tongues 20, 21. A cotter 31, which projects over the mounting surface 4 and is arranged between the plane of symmetry 9 and the locking recess 24, is provided on the opposite side of the mounting surface 4 and of the coupling section 3.

In the exemplary embodiment being shown, the locking elements 20 through 23 are arranged symmetrically to the locking recess 24 in relation to the plane of symmetry 9, so that the locking elements 20 through 23 can be caused to mesh with a corresponding locking recess 24 of another receiving element and at the locking recess 24 at the same time with the locking elements 20 through 23 of another receiving element. This also applies to the hole 30 and the cotters 31, which are likewise arranged symmetrically to the plane of symmetry 9 at or in the coupling section 3 and the mounting surface 4 thereof.

Due to this special configuration, all the components to be coupled with one another—two receiving elements or one receiving element with one connection element or one receiving element with one holding element or one holding element with one connection element—can be connected to one another as desired, and all these components have the same, identical coupling section 3 with the locking elements 20 through 23 and with the locking recess 24 as well as with the hole 30 and with the cotter 31 in the same arrangement.

The hole 30 and the cotter 31 are provided as additional, stabilizing plug-type connection elements and do not have to absolutely have be present.

FIG. 2 shows the receiving element 1 together with the securing strap 2 in a perspective sectional view. The lower locking tongue 20 with its "outwardly" or "downwardly" directed detent 22 can be seen in the first, lateral end area 5 of the coupling section 3. The hole 30 configured as a blind hole is arranged between this locking tongue 20 and the plane of symmetry 9.

Further, FIG. 2 shows the locking recess 24 with its "lower" detent edge 25 as well as with the "lower" perforation 27 in the second, lateral end area 6 of the coupling section 3. The cotter 31 is arranged between the locking recess 24 and the plane of symmetry 9.

Furthermore, the two locking recesses 15 and 16 of the securing strap can be seen, which are configured each as offset in relation to the respective limiting wall 35 and 36 of the securing strap 2, which walls are located laterally on the outside and which form a respective detent edge 37 and 38.

This mounted meshed state is shown by the perspective sectional view in FIG. 3. It can be seen that the two locking hooks 13 and 14 extend behind the respective corresponding detent edge 37 and 38 of the respective locking recess 15 and 16, so that the securing strap 2 is stationarily but detachably connected to the receiving element 1. The receiving element 1 consists of a resilient but dimensionally stable material, preferably a plastic, so that it is only necessary to push the two holding legs 7 and 8 of the receiving element 1 "together" in the direction of the two arrows 32, 33 to separate the locking connection shown in FIG. 3 between the locking hooks 13, 14 and the corresponding locking recesses 15, 16, so that the locking hooks 13, 14 become separated from the locking detent edges 37, 38 and the securing strap 2 can thus be removed from the receiving element 1 in a simpler and more reliable manner.

Figure 4:
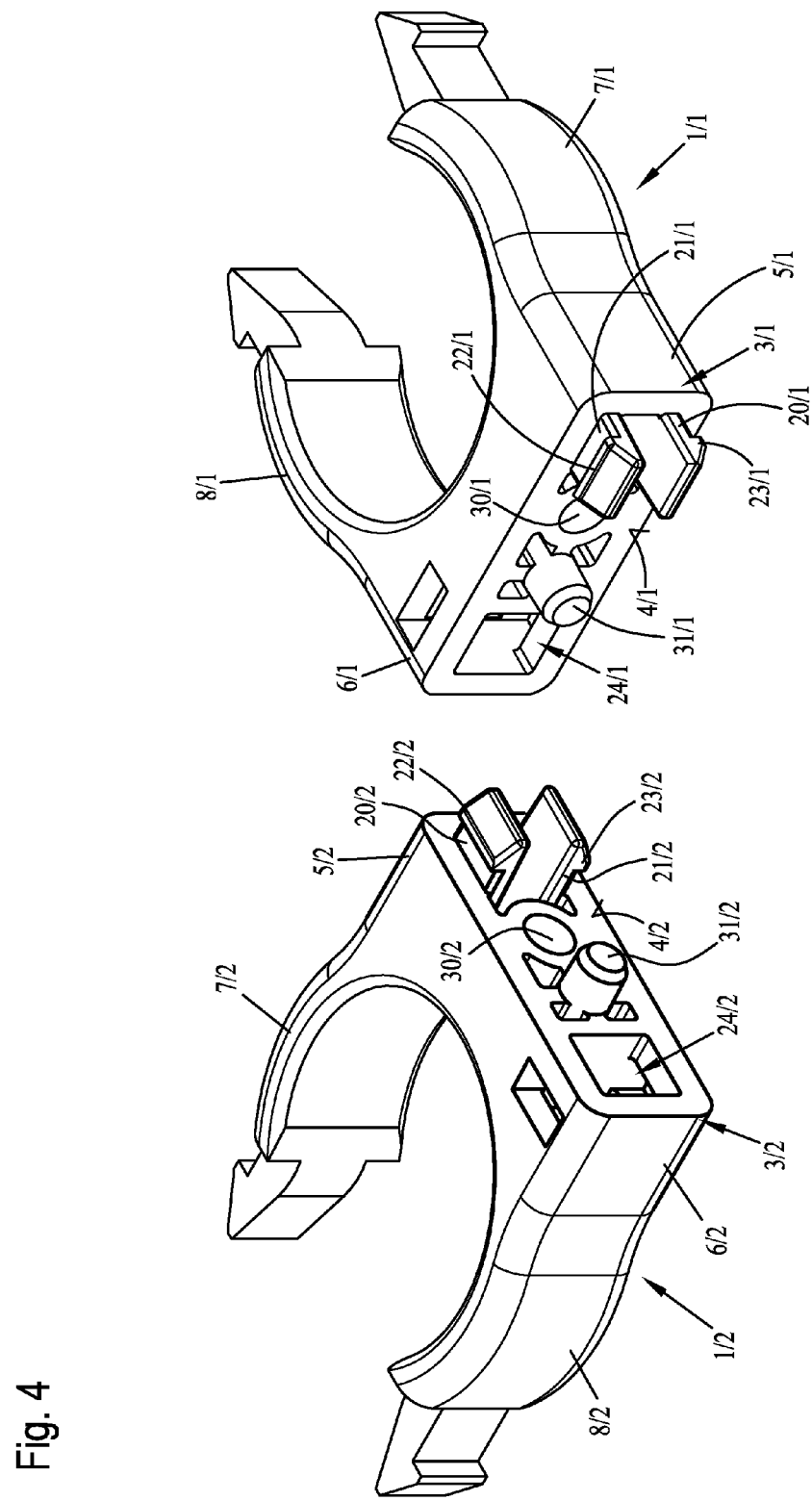
FIG. 4 is a perspective exploded view of two receiving elements that can be coupled with one another.

FIG. 4 shows two receiving elements 1/1 and 1/2 in a perspective exploded view, on the basis of which the mode of operation especially of the coupling sections will be explained as an example in more detail. The two receiving elements 1/1 and 1/2 differ from the receiving element 1 from FIGS. 1 and 2 only by the length and the arc-shaped course of the two holding legs 7/1, 8/1 as well as 7/2, 8/2, which are shorter in the embodiment variants shown and thus also have a more pronounced curvature.

The coupling element 3/1 and the coupling element 3/2 of the two receiving elements 1/1 and 1/2 have a configuration identical to that in the embodiment variant according to FIGS. 1 and 2, so that these coupling sections 3/1 and 3/2 can be coupled as desired with one another but also with the coupling section 3 of the receiving element 1 from FIGS. 1 and 2. These coupling sections 3/1 and 3/2 likewise have for this locking tongues 20/1, 21/1 as well as 20/2, 21/2 projecting over their respective mounting surfaces 4/1 and 4/2 with corresponding detents 22/1, 22/2 as well as 23/1, 23/2 in their respective first lateral end area 5/1 and 5/2. In the second respective lateral end area 6/1 and 6/2, the coupling sections 3/1, 3/2 are provided with the corresponding locking recess 24/1 and 24/2, respectively, so that the two receiving elements 1/1 and 1/2 can stationarily be coupled with one another via these coupling elements.

When fitted together, the locking tongues 20/1 and 21/1 of the coupling section 3/1 of one receiving element 1/1 will thus mesh with the locking recess 24/2 of the other receiving element 1/2 and the locking tongues 20/2, 21/2 of the coupling section 3/2 of the other receiving element 1/2 with the locking recess 24/1 of one receiving element 1/1, so that the two receiving elements 1/21 and 1/2 are stationarily in connection with one another. The coupling sections 3/1 and 3/2 are likewise provided with a respective hole 30/1 and 30/2, which will mesh with the associated cotters 31/1 and 31/2 of the respective other coupling section 3/2 and 3/1 when the two receiving elements 1/1 and 1/2 are fitted together with the associated cotters 31/1 and 31/2, respectively. The two coupling sections 3/1 and 3/2 are additionally fixed in the mounted state through the holes 30/1 and 31/2. However, these holes 30/1, 30/2 and the cotters 31/1, 31/2 do not necessarily have to be provided.

To make it possible to use the receiving elements 1, 1/1 and 1/2 as variably as possible, connection elements are, furthermore, provided, as this can be seen as an example in FIGS. 5 and 6.

The connection element 40 from FIG. 5 is used to couple three additional components, for example, three receiving elements. The connection element 40 has for this a total of three coupling sections 41, 42 and 43, whose configuration corresponds to the configuration of the coupling element 3 of the receiving element 1 from FIGS. 1 and 2 or also of the coupling elements 3/1 and 3/2 of the receiving elements 1/1 and 1/2 from FIG. 4. This can be seen in FIG. 5 especially for the coupling elements 41 and 42.

Thus, the coupling elements 41, 42 and 43 are likewise provided in their first lateral end area 5/3, 5/4 and 5/5, respectively, with respective locking tongues 20/3, 21/3 and 21/4 as well as 20/5, 21/5 projecting outwardly over the mounting surfaces 4/3, 4/4 and 4/5 thereof, whose configuration identically corresponds to the locking tongues 20 and 21 of the coupling element 3 of the receiving element 1 from FIG. 1.

In the respective second end area 6/3, 6/4 as well as 6/5, the coupling elements 3/3, 3/4, 3/5 likewise have a respective locking recess 24/3, 24/4 and 24/5. The configuration of these locking recesses 24/3, 24/5 as well as 24/4 also corresponds to the configuration of the locking recess 24 of the coupling element 3 of the receiving element 1 from FIG. 1.

It can thus be seen that the connection element 40 with its coupling sections 41, 42, 43 can be brought stationarily into connection as desired with an additional connection element 40 or also with one of the receiving elements 1, 1/1 and 1/2, respectively. Thus, a total of three such receiving elements 1, 1/1 or 1/2 can stationarily be connected to one another via this connection element 40, so that a total of three tubular or flexible tube-like objects can be received and fittingly guided in relation to one another. Furthermore, it can be seen in FIG. 5 that the coupling sections 41, 42, 43 also have a hole 30 and a corresponding cotter 31 corresponding to the configuration of the coupling section 3 of the embodiment variant of the receiving element 1 shown in FIG. 1. Only the holes 30 and cotters 31 of the two coupling sections 41 and 43 can be seen in FIG. 5.

FIG. 6 shows a second exemplary embodiment of a connection element 50, which has a total of four coupling sections 51, 52, 53 and 54. These coupling elements 51 through 54 are also provided with corresponding locking tongues 20/6, 21/6 as well as 21/7 and 21/8 as well as 20/9 and 21/9. The two "rear" coupling sections 53 and 54 also have a "lower" locking tongue, but it is not visible in FIG. 6.

The coupling sections 51 through 54 are also provided with corresponding locking recesses 24/6, 24./7, 24/8 and 24/9. The configuration of the coupling sections 51 through 54 with the "connection elements" thereof also corresponds to the configuration of the coupling section 3 of the embodiment variant of the receiving element 1 according to FIG. 1, so that especially receiving elements 1, 1/1, 12, but also the connection element 40 can be caused to mesh stationarily as desired with one of the coupling sections 51, 52, 53 and 54, respectively.

The coupling sections 51 through 54 are also provided with corresponding holes 30 and cotters 31, as this can be seen in FIG. 6 for the coupling sections 51 and 52.

If a total of four receiving elements 1, 1/1 or 1/2 are caused to mesh with the connection element 50, four tubular or flexible tube-like objects can also be securely guided or held here at spaced locations from one another as desired. Furthermore, it is also possible to couple the connection element 40 with the connection element 50, so that a total of six receiving elements 1, 1/1 or 1/2 can be connected to one another in this case.

Figure 7:
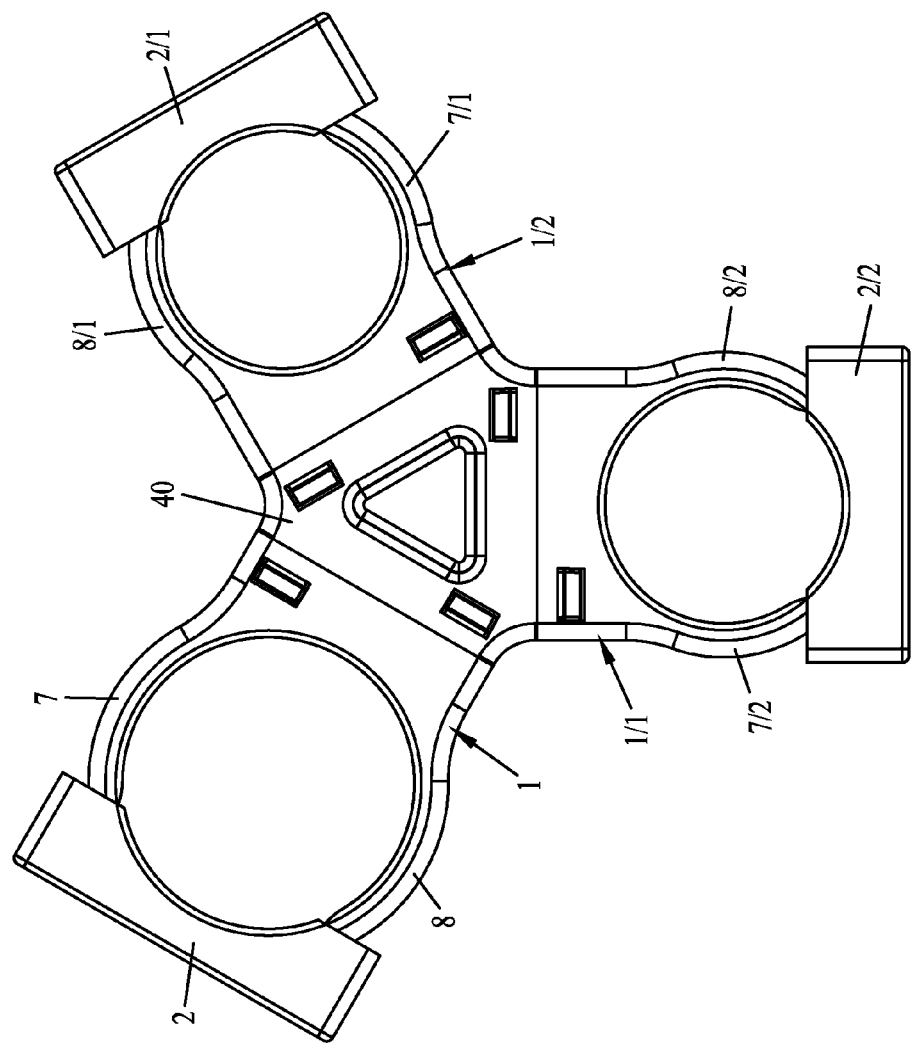
FIG. 7 is a top view of the connection element from FIG. 5 with a total of three coupled receiving elements.
Figure 8:
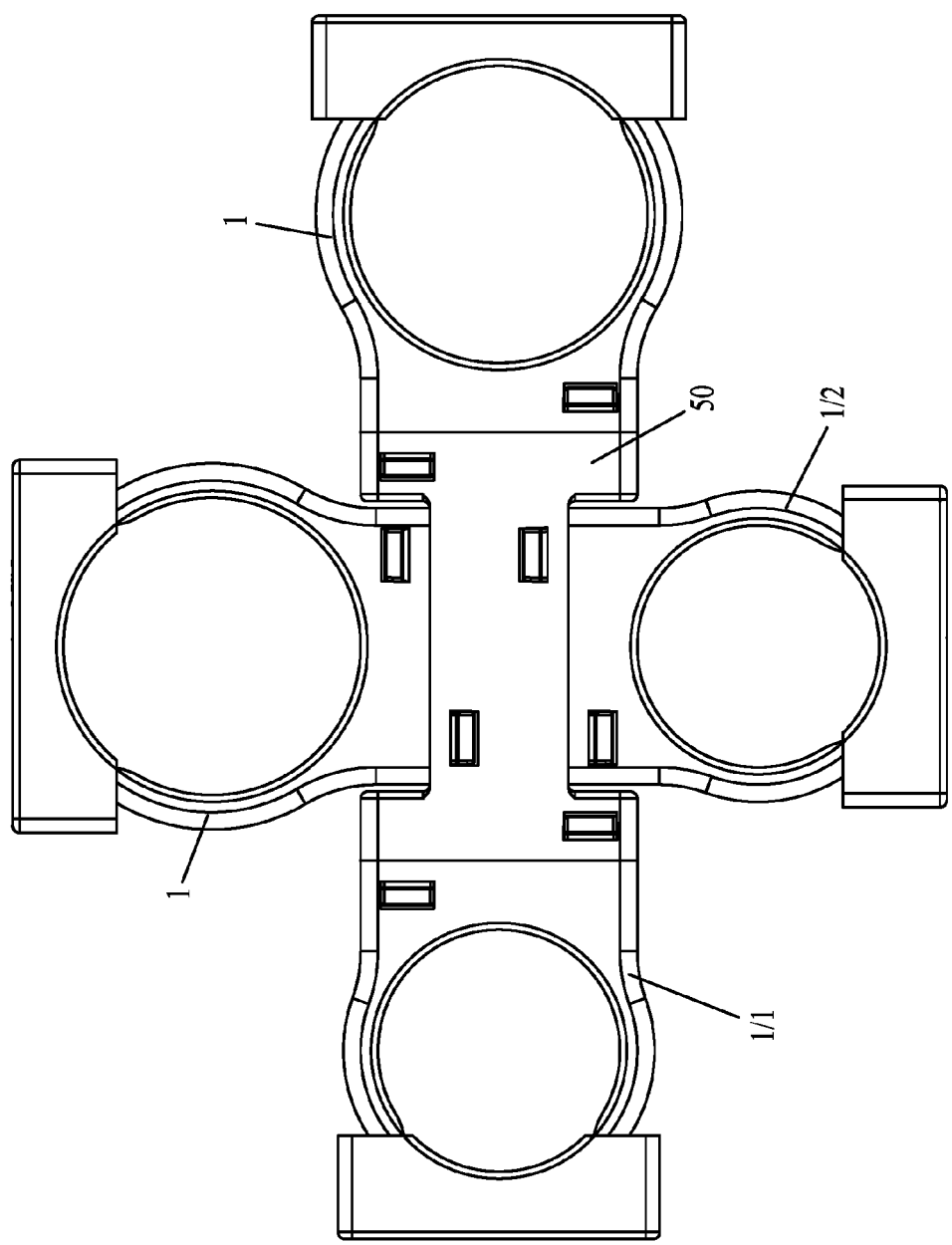
FIG. 8 is a top view of the connection element from FIG. 6 with a total of four coupled receiving elements.

In regard to the coupling possibilities, the drawing FIGS. 7 and 8 show a top view each of a respective coupling element 40 and 50. In FIG. 7, the connection element 40 is stationarily in connection with a total of three receiving elements 1, 1/1 and 1/2. The respective securing straps 2, 2/1 and 2/3 correspondingly belonging to them are attached to the holding legs 7, 8 and 7/1, 8/1 as well as 7/2, 8/2 of the receiving elements 1, 1/1, 1/2.

FIG. 8 shows a top view of the connection elements 50, which is, in turn, in connection with four receiving elements 1, 1/1 and 1/2, two receiving elements 1 being coupled as desired with the connection element 50 in the view shown in FIG. 8.

FIG. 9 shows a perspective view of a possible configuration of a holding element 60, which can be coupled as desired with one of the connection elements 40 and 50 or also with one of the receiving elements 1, 1/1 or 1/2. The holding element 60 has for this purpose a coupling section 61, which has a configuration essentially identical to that of the coupling section 3 of the receiving element 1 shown in FIG. 1.

The coupling section 61 correspondingly has in one of its end areas 62 provided with corresponding locking tongues 20/10 and 21/10, whose configuration corresponds, in turn, to that configuration of the locking tongues 20 and 21 of the receiving element 1 shown in FIG. 1. In its second end area 63, the coupling section 61 has, in turn, a locking recess 64, whose configuration corresponds to the locking recess 24 seen in the exemplary embodiment of the receiving element 1 shown in FIG. 1.

Furthermore, it is seen in FIG. 9 that the holding element 60 forms, laterally "next" to the respective end areas 62 and 63, a respective mounting flange 65 and 66, which are provided each with a respective mounting hole 67 and 68. The holding element 60 can stationarily be fastened via these mounting holes 67 and 68, for example, on a ceiling, a wall or another foundation.

Based on the configuration of the coupling section 61, which likewise has a hole 30 as well as a cotter 31, the holding element 60 can stationarily be coupled as desired with one of the receiving elements 1, 1/1 or 1/2 or even with one of the connection elements 40 or 50.

FIG. 10 shows for this as an example a top view with the holding element 60, with the connection element 40 as well as with two receiving elements 1 and 1/1. Thus, these two receiving elements 1 and 1/1 can be mounted stationarily on a foundation or on a wall or on a ceiling via the connection element 40 as well as the holding element 60.

It can be seen that based on the configuration according to the present invention, especially of the coupling sections, a holding or guiding device is provided, which can be used with its receiving elements 1, 1/1, 1/2 to receive and guide one or more tubular or elongated objects in an extremely variable manner. Both the receiving elements 1, 1/1, 1/2 and the connection elements 40 and 50 can be combined with one another "as desired," and the holding element 60 can additionally be used if needed for a stationary holding. If the holding element 60 is not needed, the corresponding elongated tubular or flexible tube-like objects are guided "loosely," and these do not mutually touch each other but are guided "in packets" against each other depending on their number and can thus be "installed" in a defined manner in a simple way.

While specific embodiments of the invention have been shown and described in detail to illustrate the application of the principles of the invention, it will be understood that the invention may be embodied otherwise without departing from such principles.

What is claimed is:

1. A guiding or holding device comprising a U-shaped or C-shaped receiving element for receiving a pipe, flexible tube or a cable, the receiving element having a coupling section arranged in a circumferential area of the receiving element and the coupling section comprising:
    an outer mounting surface; and coupling elements arranged in an area of the mounting surface, the coupling elements projecting over the mounting surface as well as protruding into the mounting surface, wherein the receiving element is coupleable, via the coupling elements with another receiving element, with a holding element or with a connection element, wherein: the mounting surface defines a plane of symmetry, which extends at right angles to the receiving element; the coupling elements are configured as a locking element projecting over the mounting surface in one lateral area of the plane of symmetry and as a locking recess protruding into the mounting surface in another lateral area of the plane of symmetry; the locking element and the locking recess are arranged symmetrically to the plane of symmetry; and the coupling section defines means for detachable coupling the coupling section with a coupling section of a same configuration of another component; the receiving element forms mutually spaced holding legs with end sections forming projecting detents; and a securing strap with locking recesses corresponding to the projecting detents are lockingly and detachably attachable to the projecting detents.

2. A guiding device in accordance with claim 1, further comprising a cotter in the area of the mounting surface between the locking element and the locking recess on one side of the plane of symmetry and a hole provided on the other side of the plane of symmetry, said cotter and said hole being spaced a same distance from the plane of symmetry, arranged symmetrically to the plane of symmetry.

3. A guiding device in accordance with claim 1, in combination with the another receiving element or the holding element, wherein the another receiving element or the holding element is provided with a mounting surface, which coupling elements that are the same as the receiving element.

4. A guiding device in accordance with claim 1 in combination with the connection element, wherein the connection element has two or more mounting surfaces, for coupling with two or more receiving elements, which have the same coupling elements as the two or more receiving elements.

5. A guiding device in accordance with claim 1, wherein: end sections of the receiving element are arranged symmetrically to the plane of symmetry.

6. A guiding device in accordance with claim 1, in combination with the connection element or the holding element, wherein the holding element is coupled with the connection element or with the receiving element.

7. A guiding or holding device comprising:
    a U-shaped or C-shaped receiving element for receiving pipes, flexible tubes or cables; a coupling section defined by a circumferential portion of the receiving element and wherein the coupling section comprises:
    a mounting surface defining a connection plane; couplings elements in an area of the mounting surface, wherein the coupling elements comprise projecting coupling elements that project outwardly from the connection plane of the mounting surface and protruding coupling elements that protrude inwardly from the connection plane of the mounting surface, wherein the coupling elements of the coupling section are arranged in the area of the mounting surface to define means for detachable coupling of the coupling section with a coupling section of an identical configuration of a different receiving element or with a coupling section of an identical configuration of a holding element or with a coupling section of an identical configuration of a connection element, with the connection plane of the mounting surface being essentially parallel and contacting or nearly contacting connection plane of the mounting surface of the coupling section of the identical configuration, wherein: the U-shaped or C-shaped receiving element and the mounting surface define a plane of symmetry, which extends at right angles to the receiving element; the projecting coupling elements are configured as a projecting locking element projecting outwardly of the mounting surface in one lateral area of the plane of symmetry; the protruding coupling elements are configured as a locking recess protruding into the mounting surface in another lateral area of the plane of symmetry; the projecting locking element and the locking recess are arranged symmetrically to the plane of symmetry; the receiving element forms mutually spaced holding legs with end sections forming projecting detents; and a securing strap with locking recesses corresponding to the projecting detents is lockingly and detachably attachable to the projecting detents.

8. A guiding or holding device in accordance with claim 7, further comprising a cotter in the area of the mounting surface between the projecting locking element and the locking recess on one side of the plane of symmetry and a hole provided on the other side of the plane of symmetry, said cotter and said hole being spaced a same distance from the plane of symmetry, arranged symmetrically to the plane of symmetry.

9. A guiding or holding device in accordance with claim 7, in combination with the another receiving element or the holding element, wherein the another receiving element or the holding element provided with the coupling section of the identical configuration.

10. A guiding device in accordance with claim 7 in combination with the connection element, wherein the connection element has two or more mounting surfaces, each having the coupling section of the identical configuration.

11. A guiding or holding device in accordance with claim 7, in combination with the connection element or the holding element, wherein the holding element is coupled with the connection element or with the receiving element.

* * * * *